United States Patent
Falzone et al.

(10) Patent No.: US 6,641,008 B2
(45) Date of Patent: Nov. 4, 2003

(54) SHOULDER STRAP HARNESS LIFTING DEVICE

(75) Inventors: Franco Falzone, Rochester, NY (US); Charles Fox, Rochester, NY (US); Louis R. Rivaldo, Rochester, NY (US)

(73) Assignee: Sure-Strap, Inc., Rochester, NY (US)

( * ) Notice: Subject to any disclaimer, the term of this patent is extended or adjusted under 35 U.S.C. 154(b) by 70 days.

(21) Appl. No.: 10/050,480

(22) Filed: Jan. 18, 2002

(65) Prior Publication Data
US 2003/0136807 A1 Jul. 24, 2003

(51) Int. Cl.[7] ................................................. A61G 5/00
(52) U.S. Cl. ........................................ 224/157; 224/259
(58) Field of Search ................................ 224/157, 184, 224/259; 294/152, 157

(56) References Cited

U.S. PATENT DOCUMENTS

| | | | | |
|---|---|---|---|---|
| 2,431,780 A | * | 12/1947 | Theal | 224/157 |
| 3,038,644 A | * | 6/1962 | Johnson | 224/184 |
| 4,887,752 A | * | 12/1989 | Nauta | 224/157 X |
| 5,503,448 A | * | 4/1996 | Dewey | 294/152 |
| 5,833,292 A | * | 11/1998 | Lyons, Jr. | 294/152 |
| 6,039,376 A | * | 3/2000 | Lopreiato | 294/152 |
| 6,508,389 B1 | * | 1/2003 | Ripoyla et al. | 224/157 |

* cited by examiner

Primary Examiner—Stephen K. Cronin
(74) Attorney, Agent, or Firm—Shlesinger, Fitzsimmons & Shlesinger

(57) ABSTRACT

Two shoulder harnesses are made from a pair of elongate flexible straps, each of which has a pair of like shoulder-engagable loops formed on opposite ends thereof and connected by a central section of the associated strap. One strap has formed in its central section, which is longer than that of the other strap, a plurality of spaced openings in one of which the other strap is releasably and slidably connected intermediate its ends. In use the interconnected center sections of the straps are positioned beneath a load that can then be lifted by the operators wearing the respective shoulder harnesses. The overall length of the load-bearing sections can be adjusted by inserting the other strap through a different opening in the one strap.

10 Claims, 2 Drawing Sheets

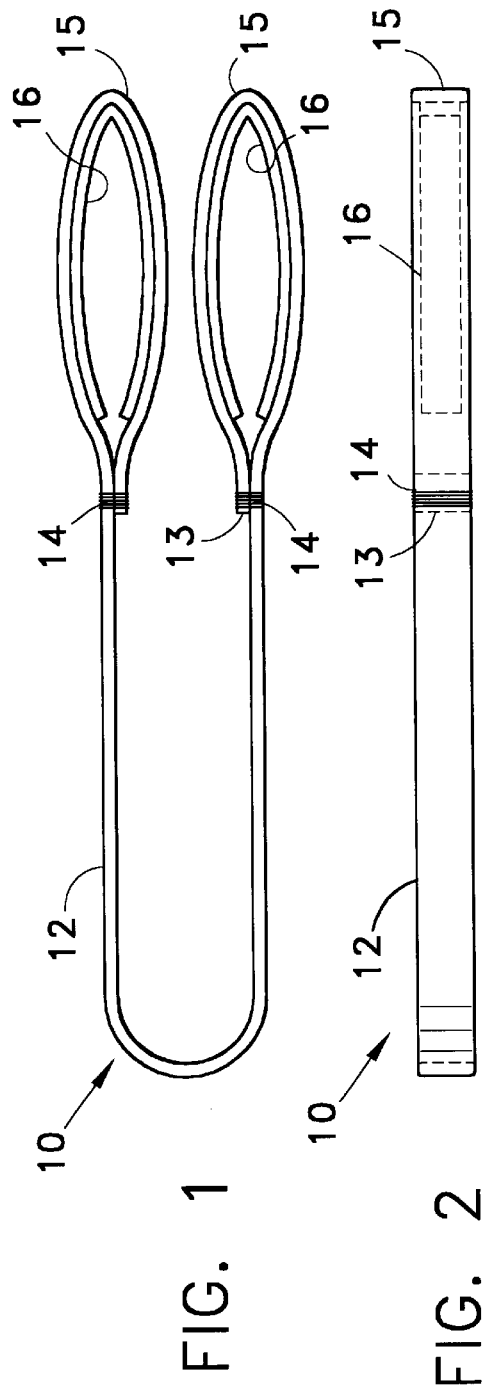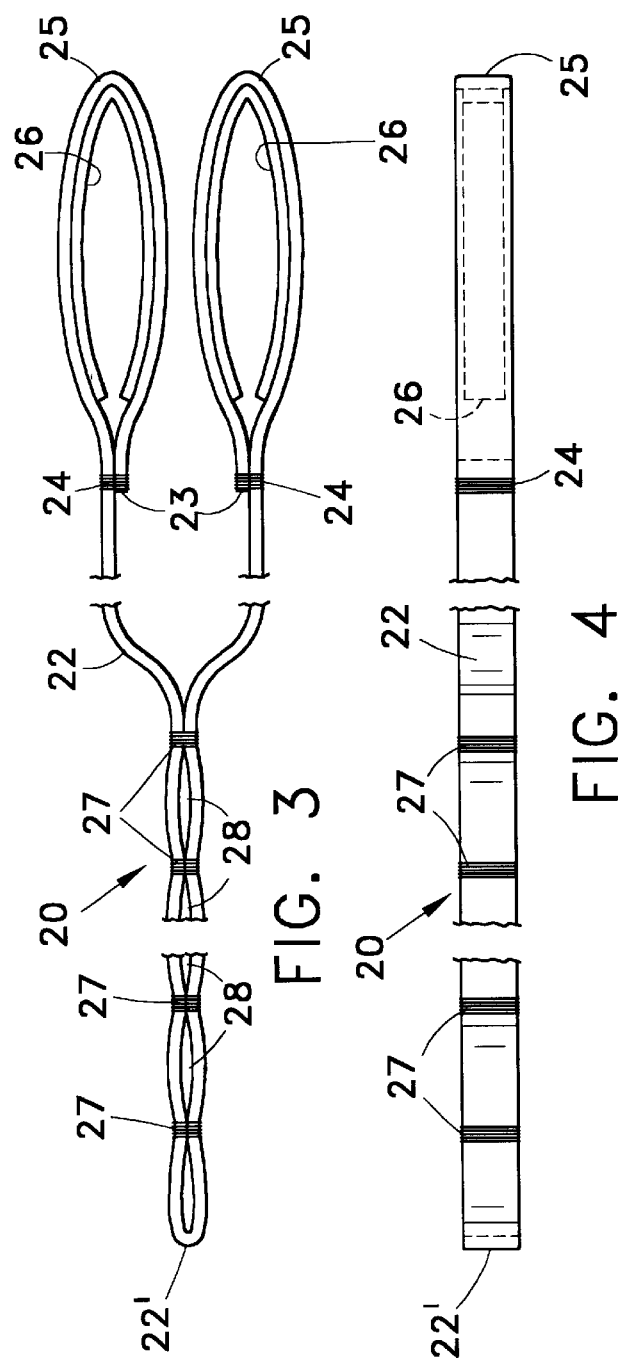

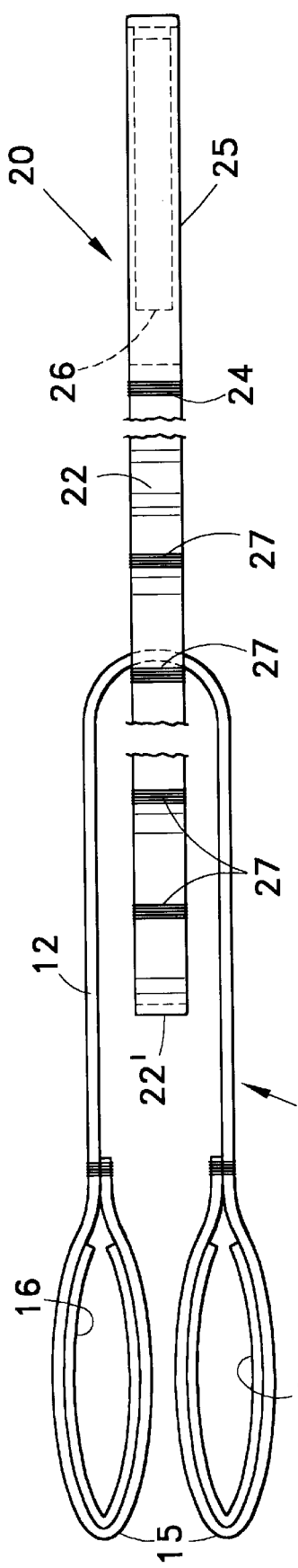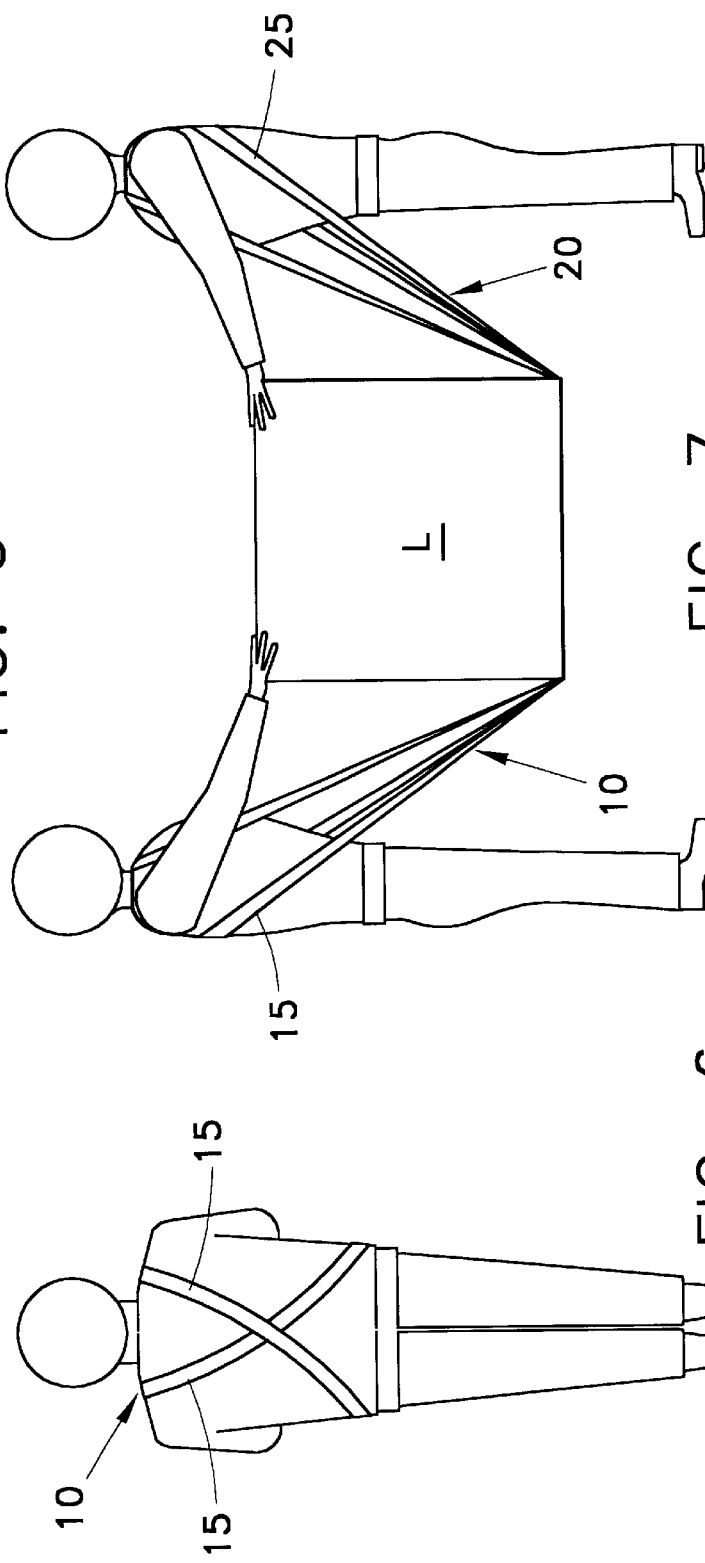

US 6,641,008 B2

SHOULDER STRAP HARNESS LIFTING DEVICE

BACKGROUND OF THE INVENTION

This invention relates to a pair of shoulder strap harnesses for forming a device which is particularly suited for use in lifting and transporting heavy items. More particularly this invention relates to two shoulder strap harnesses, each harness comprising a pair of padded flexible loops disposed to be mounted over the shoulders of each of two individuals, with the two harnesses being interconnected by a flexible load bearing strap section. Even more particularly, one harness is disposed to be adjustably connected to the load bearing strap section so that the distance between the two harnesses can be adjusted to handle loads of different sizes.

There are currently available in the marketplace numerous so-called load bearing harnesses disposed to be removably mounted on the shoulders of an individual and to assist the individual in carrying various loads, for example carrying backpacks, child-supporting harnesses in addition to golf bag, surfboard, holster and archery bow supporting harnesses. Also, of course, harnesses for animals have been available for use in having the animals assist in hauling very heavy or mobile weights.

However, as noted above, most load-bearing harnesses for individuals have been designed to assist a respective individual in bearing on his or her body a particular load that is to be carried or moved. Missing, however, is an effort to interconnect the harnesses of two individuals so that the two in turn may cooperate with each other in order to lift and move items that would be too heavy for one individual to lift or move alone.

Accordingly, it is an object of this invention to provide a pair of improved shoulder harnesses disposed to be releasably connected one to the other by an intervening, flexible, generally strap-shaped load-bearing section that extends between the harnesses.

Another object of this invention is to provide a novel shoulder harness lifting device made from a pair of elongate flexible straps having shoulder-engaging loops formed on opposite ends thereof, and having load-bearing central sections thereof releasably interconnecting and adjustably separating the loops of one strap from the loops of the other strap.

A further object of this invention is to provide an improved shoulder harness lifting device of the type described wherein the overall length of the load bearing sections of the straps can be readily adjusted.

Other objects of this invention will be apparent hereinafter from the specification and from the recital of the appended claims, particularly when read in conjunction with the accompanying drawings.

SUMMARY OF THE INVENTION

A first shoulder strap harness is made from a first elongate, flexible strap having shoulder engagable loops formed on opposite ends thereof and connected by an elongate load bearing section of the strap. A second harness is made from a longer, flexible strap having similar loops formed on opposite ends thereof and connected by a load bearing section longer than that of the first strap, and having therein a plurality of spaced openings. In use, one end of the first strap is inserted slidably through one of the openings in the second strap, depending on the size of the load to be lifted, after which the loops of the two straps are inserted over the shoulders of two people who are to lift a load, and with the load bearing sections of the straps positioned beneath the load.

THE DRAWINGS

FIG. 1 is a plan view of one of two improved shoulder harnesses made according to one embodiment of this invention;

FIG. 2 is a side elevational view of the harness shown in FIG. 1;

FIG. 3 is a plan view of a second harness made according to an embodiment of this invention, the second harness being longer than the harness shown in FIGS. 1 and 2, and being broken away in parts for purposes of illustration;

FIG. 4 is a side elevational view of the harness shown in FIG. 3, again with portions thereof broken away for purposes of illustration;

FIG. 5 is a plan view of the harness shown in FIG. 1 and a side elevational view of the harness as shown in FIG. 4, and illustrating the manner in which the harness of FIG. 1 is disposed to be releasably connected to the other harness as shown in FIG. 4;

FIG. 6 is a schematic view of the back of a person wearing one of the shoulder harnesses shown in FIGS. 1 and 3; and FIG. 7 is a schematic view illustrating the manner in which a load is disposed to be carried on the load-bearing strap shaped section that interconnects the two harnesses which are being worn by two different people.

DETAILED DESCRIPTION OF THE PREFERRED EMBODIMENTS

Referring now to the drawings by numerals of reference, and first to FIGS. 1 to 4, 10 denotes generally a first shoulder harness comprising an elongate, flexible strap 12 made, for example, from a cloth, plastic or leather material. Like portions of strap 12 adjacent the opposite ends 13 thereof are folded inwardly into engagement with the same side of strap 12 in spaced relation to each other, where marginal portions of the ends 13 are sown or otherwise fixed securely as at 14 to the strap. The folded portions of strap 12 thus function to form on opposite ends of the strap two enlarged loops 15 which are disposed to be inserted over a person's head with each loop overlying in a different one of the person's shoulders. To provide some comfort for the person wearing the harness 10, the portion of the inner surface of the strap 12 forming each loop 15 is covered with a thin, flexible pad 16.

A second shoulder harness is denoted generally by the numeral 20 in FIGS. 3 and 4. Harness 20 is produced from another, elongate, flexible strap 22, which like strap 12 may be made by fabric, plastic, leather or like material, but which is substantially longer than strap 12. As in the case of strap 12, like portions of strap 22 adjacent the opposite ends 23 thereof are folded over against the same side of strap 22 where the ends 23 are sown or otherwise snugly secured to the strap 22, thus producing two shoulder engaging loops 25 at opposite ends of strap 22. As in the case of harness 10 the inside surfaces of the loops 25 are covered, or have secured thereto, resilient pads 26. As shown in FIGS. 1 and 2, apart from the sections 14 where the ends 13 of strap 12 are secured snugly against the same surface thereof, the remainder of strap 12 between the secured sections 14 is unencumbered, so that if desired; the two loop sections 15 can be separated from each other to the point in which the section of strap 12 between the two secured sections 14 can be disposed in a straight line. However, this is not possible with the harness shown in FIGS. 3 and 4, since remote from its loop shaped ends 25, strap 22 is folded about its midpoint 22' thereby to place elongate portions of one surface thereof (the surface engaged by the strap ends 23) in registering, confronting relation to each other, and these confronting portions are sown or otherwise secured together at spaced regions 27 therealong. As shown more clearly in FIG. 3, the registering portions of strap 20 between each pair of adjacent sections 27 are separable from each other, thereby forming in this section of the harness 20 a plurality of spaced openings 28 the purpose of which will be noted hereinafter.

To place this harness system in use, one of the loops 15 of harness 10 is inserted through one of the several openings 28 in the harness 20, and is drawn until, for example, equal portions of the straps 12 extend beyond the midpoint 22' of harness 20. In practice, of course, harness 10 can be connected to harness 20 through any one of the numerous spaced openings or slots 28 in harness 20, depending upon the amount of load-bearing surface that is to be employed between the two interconnected harnesses 10 and 20. In practice, this load-bearing surface is dependent upon the distance separating the two harnesses 10 and 20 and in turn this depends upon the number of openings 28 formed in harness 20, and the respective distance between each pair of adjacent sectors 27. By way of example, adjacent sectors 27 will be separated from each other in the amount of approximately 4 ¾ inches each, and the overall length of the strap 20 will be sufficient to enable the creation of upwardly of ten slots 28 in harness 20.

In any event, once the harness 10 has been connected to the harness 20 as shown for example in FIG. 5, the loops 15 of harness 10 could then be placed over the shoulders of one person, as shown for example in FIG. 6, while the loops 25 of the harness 20 could be positioned over the shoulders of another person, such as shown for example at the right in FIG. 7. At such time, the load-bearing section of the interconnected harnesses could be positioned beneath the load L (FIG. 7) at which time the two persons wearing the harnesses 10 and 20 would then cooperate, as shown for example in FIG. 7, to lift and manipulate the load L by carrying it from one place to another.

From the foregoing, it will be apparent that the present invention provides a very simple and inexpensive load-bearing lifting device comprising a pair of shoulder harnesses which can be releasably connected one to the other, and are readily adjustable to vary the distance separating the harnesses depending upon the size of the load that is to be moved. The flexibly connected harnesses simplify the maneuvering of loads over uneven ground and through houses, making sharp turns, and up and down stairways. In practice the pads 16 and 26 which are secured to the inside surface of the loops 15 and 25 could, by way of example, be upwardly of sixty inches in length and anywhere from ¼ inch to a ½ inch in thickness. The strap 12 forming the shoulder harness 10 may be in the vicinity of 189 inches in length, while strap 12 may be in the vicinity of 262 inches in length. These dimensions, of course, are merely by way of example, and it will be readily apparent to one skilled in the art that they can be adjusted depending upon the size of the persons that are disposed to wear the harnesses and also upon the size of the loads that are to be manipulated. Also, of course, the straps 12 and 22 may be made from any suitable non-stretchable, flexible material capable of carrying loads of the type referred to above, and if desired the ends 13 and 23 of the respective straps 10 and 20 could be secured to opposite surfaces of the associated strap rather than to the same surface.

While this invention has been illustrated and described in detail with only certain embodiments thereof, it will be apparent to one skilled in the art that this application is intended to cover any such modifications that may fall within the scope of one skilled in the art, or the appended claims.

What is claimed is:

1. A shoulder strap harness lifting device, comprising
   a pair of elongate, flexible straps each having a pair of shoulder-engagable loops formed at opposite ends thereof and connected by an elongate load-bearing central section of the associated strap,
   said central section of one of said straps being longer than the central section of the other of said straps and forming intermediate the ends thereof a plurality of spaced openings, and
   said other of said straps extending intermediate its ends removably through one of said openings in said one strap operatively to connect one of said pair of loops to the other pair thereof by said load-bearing sections of said straps.

2. A shoulder strap harness lifting device as defined in claim 1, including a flexible pad secured to the inside surface of each of said loops formed on said straps.

3. A shoulder strap harness lifting device as defined in claim 1, wherein portions of each of said straps adjacent opposite ends thereof are folded into engagement with and secured to one side of the associated strap to form thereon said pair of loops.

4. A shoulder strap harness lifting device as defined in claim 1, wherein spaced portions of said central section of said one strap are folded into engagement with and secured to each other to form said spaced openings in said one strap.

5. A shoulder strap harness lifting device, comprising
   a first elongate flexible strap having a pair of shoulder-engagable loops formed in opposite ends thereof and connected by an elongate load-bearing section of said strap,
   a second elongate flexible strap having a pair of shoulder-engagable loops formed on opposite ends thereof and connected by a load-bearing section thereof longer than the load bearing section of said first strap,
   said load-bearing section of said second strap having formed therein intermediate its ends a plurality of spaced openings, and
   said first strap extending slidably and removably intermediate its ends through one of said openings in said load-bearing section of said second strap, thereby connected said pairs of loops by said load-bearing sections of said straps.

6. A shoulder strap harness lifting device as defined in claim 5, wherein a first of
   said spaced openings in said load-bearing section of said second strap is positioned adjacent said pair of loops on said second strap, and the remainder of said spaced loops are spaced progressively further away from said first opening.

7. A shoulder strap harness lifting device as defined in claim 6, including a flexible pad secured to the inside of each of said loops formed on each of said straps.

8. A shoulder strap harness lifting device as defined in claim 5, wherein
   said second strap is folded medially of its ends to place major portions of said load-bearing section thereof into registering confronting relation to each other, and
   said registering portions of said second strap are secured together at longitudinally spaced areas therealong, thereby to form said spaced openings in said second strap.

9. A shoulder strap harness lifting device as defined in claim 8, wherein said straps are substantially equal in width, and each of said spaced openings in said second strap is slightly wider than said first strap.

10. A shoulder strap harness lifting device as defined in claim 8, wherein marginal end portions of each of said straps adjacent opposite ends thereof are folded into engagement with one side of the associated strap and secured thereto to form said pair of loops thereon.

* * * * *